(12) United States Patent
Yadav et al.

(10) Patent No.: US 12,454,458 B2
(45) Date of Patent: *Oct. 28, 2025

(54) FUNCTIONALIZATION AND DISPERSION OF CARBON NANOTUBES

(71) Applicant: Vibrantz Technologies Inc., Houston, TX (US)

(72) Inventors: Santosh K. Yadav, Geneva, OH (US); Paul A. Rettinger, Ashtabula, OH (US)

(73) Assignee: Vibrantz Technologies, Inc., Ashtabula, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/627,602

(22) Filed: Apr. 5, 2024

(65) Prior Publication Data
US 2024/0270578 A1 Aug. 15, 2024

Related U.S. Application Data

(63) Continuation of application No. 17/752,416, filed on May 24, 2022, now Pat. No. 11,981,567.
(Continued)

(51) Int. Cl.
*H01B 1/24* (2006.01)
*C01B 32/174* (2017.01)

(52) U.S. Cl.
CPC ............. *C01B 32/174* (2017.08); *H01B 1/24* (2013.01); *C01B 2202/22* (2013.01); *C01P 2004/13* (2013.01); *C01P 2006/40* (2013.01)

(58) Field of Classification Search
CPC ..... H01B 1/24; C01B 32/174; C01B 2202/22; B29C 35/02; B29D 7/01
See application file for complete search history.

(56) References Cited

U.S. PATENT DOCUMENTS 10,978,216 B2 * 4/2021 Taguchi .................. H01B 1/24
2013/0214214 A1 8/2013 Carnahan
(Continued)

OTHER PUBLICATIONS

Hassouneh et al "Soft and flexible conductive PDMS/MWCNT composites", J. Appl. Polym. Sci. 2017, 134, 44767.*
(Continued)

*Primary Examiner* — Mark Kopec
(74) *Attorney, Agent, or Firm* — Benesch Friedlander Coplan & Aronoff LLP

(57) ABSTRACT

The present disclosure describes several embodiments for methods of deagglomerating, debundling, and dispersing carbon nanotubes and functionalizing such carbon nanotubes without damage to the properties of the carbon nanotubes. The embodiments include methods for determining optimized conditions to effectively produce master batches of carbon nanotube polymers and solvent systems; determining what moieties or chemistries effectively disperse carbon nanotubes without deleterious effect upon electrical properties of a resulting composite; determining the most efficient processes for introducing dispersants to carbon nanotubes; determining surface characteristics of carbon nanotubes induced by deagglomerating, debundling, and dispersion processes; evaluating properties (such as conductivity) of carbon nanotube dispersions in cured coatings and composite applications; determining what structural elements comprise efficient/effective dispersants for carbon nanotubes; and evaluating the hyperdispersant properties in carbon nanotube composite and coatings systems.

6 Claims, 7 Drawing Sheets

Related U.S. Application Data

(60) Provisional application No. 63/192,359, filed on May 24, 2021.

(56) References Cited

U.S. PATENT DOCUMENTS

| | | |
|---|---|---|
| 2014/0322447 A1 | 10/2014 | Qi |
| 2018/0197663 A1 | 7/2018 | Kamata |
| 2019/0315975 A1 | 10/2019 | Hong |
| 2020/0040185 A1 | 2/2020 | Jang |

OTHER PUBLICATIONS

Somasekharan et al "Natural rubber nanocomposites with MWCNT@POSS hybrid filler: Preparation and propertiesNatural rubber nanocomposites with MWCNT@POSS hybrid filler: Preparation and properties", Polymer Composites. 2020;41:369-380.*

Barra et al "Different Methods of Dispersing Carbon Nanotubes in Epoxy Resin and Initial Evaluation of the Obtained Nanocomposite as a Matrix of Carbon Fiber Reinforced Laminate in Terms of Vibroacoustic", Materials 2019, 12, 2998; doi:10.3390/ma12182998.*

Somasekharan et al "Multiwalled carbon nanotubes@octavinyl polyhedral oligomeric silsesquioxanes nanocomposite preparation via cross-linking reaction in acidic media", J Nanopart Res (2016) 18: 337.*

Rezazadeh et al, "Effect of Amine-functionalized dispersant on cure and electrical properties of carbon nanotube/epoxy nanocomposites", Progress in Organic Coatings 111 (2017) 389-394.

Handbook of Thermoplastic Elastomers 2014, Chapter 4, Sections 4.1-4.2.4, pp. 33-52.

Gao et al "A comparative study of damage sensing in fiber composites using uniformly and non-uniformly dispersed carbon nanotubes", Carbon 48 (2010) 3788-3794.

Hollertz et al "Improvement of toughness and electrical properties of epoxy composites with carbon nanotubes prepared by industrially relevant processes", Nanotechnology 22 (2011) 125702 (9pp).

Lavagna et al "Functionalization as a way to enhance dispersion of carbon nanotubes in matricies: a review", Materials Today Chemistry 20 (2021) 100477.

Yue et al "Study on preparation and properties of carbon nanotubes/rubber composites", J Mater Sci 41 (2006) 2541-2544.

Zhou et al "New fabrication and mechanical properties of styrene-butadiene rubber/carbon nanotubes nanocomposite", J. Mater. Sci. Technol., 2010, 26(12), 1127-1132.

\* cited by examiner

FUNCTIONALIZATION AND DISPERSION OF CARBON NANOTUBES

CROSS REFERENCE TO RELATED APPLICATION

This Application is a continuation of U.S. patent application Ser. No. 17/752,416 filed May 24, 2022, now U.S. Pat. No. 11,981,567, which claims priority to U.S. Provisional Patent Application Ser. No. 63/192,359, titled "Functionalization and Dispersion of Carbon Nanotubes," filed on May 24, 2021, which is expressly incorporated by reference herein in its entirety.

FIELD OF INVENTION

The present disclosure generally relates to novel methods and systems for deagglomerating, debundling, dispersing, and functionalizing carbon nanotubes into a medium to form useful composites and coatings. More specifically, the present disclosure relates to novel methods and systems for deagglomerating, debundling, dispersing, and functionalizing carbon nanotubes into a medium to form functional composites and coatings without damaging the carbon nanotubes or changing the physical properties of the carbon nanotubes.

BACKGROUND

Recently considerable interest has grown in electrical benefits of nanocarbon-based thermally reactive composites and coatings using carbon nanotubes to achieve electrostatic dissipative (ESD) and conductive characteristics. However, it has proven to be difficult to deagglomerate, debundle, and disperse carbon nanotubes in media to form functional composite materials. There is a need in the industry for repeatable methods for deagglomerating, debundling, dispersing, and functionalizing carbon nanotubes in media to form composite materials with consistent physical properties. Such methods are disclosed herein.

SUMMARY

The present disclosure describes several embodiments for methods of deagglomerating, debundling, and dispersing carbon nanotubes (CNT) and functionalizing such carbon nanotubes without damage to the properties of the carbon nanotubes. The embodiments include methods for determining optimized conditions to effectively produce master batches of carbon nanotube polymers and solvent systems; determining what moieties or chemistries effectively disperse carbon nanotubes without deleterious effect upon electrical properties of a resulting composite; determining the most efficient processes for introducing dispersants to carbon nanotubes; determining surface characteristics of carbon nanotubes induced by deagglomerating, debundling, and dispersion processes; evaluating properties (such as conductivity) of carbon nanotube dispersions in cured coatings and composite applications; determining what structural elements comprise efficient/effective dispersants for carbon nanotubes; and evaluating the hyperdispersant properties in carbon nanotube composite and coatings systems.

BRIEF DESCRIPTION OF THE DRAWINGS

In the accompanying drawings, structures are illustrated that, together with the detailed description provided below, describe example embodiments of the disclosed systems, methods, and apparatus. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

DETAILED DESCRIPTION

Figure 1:
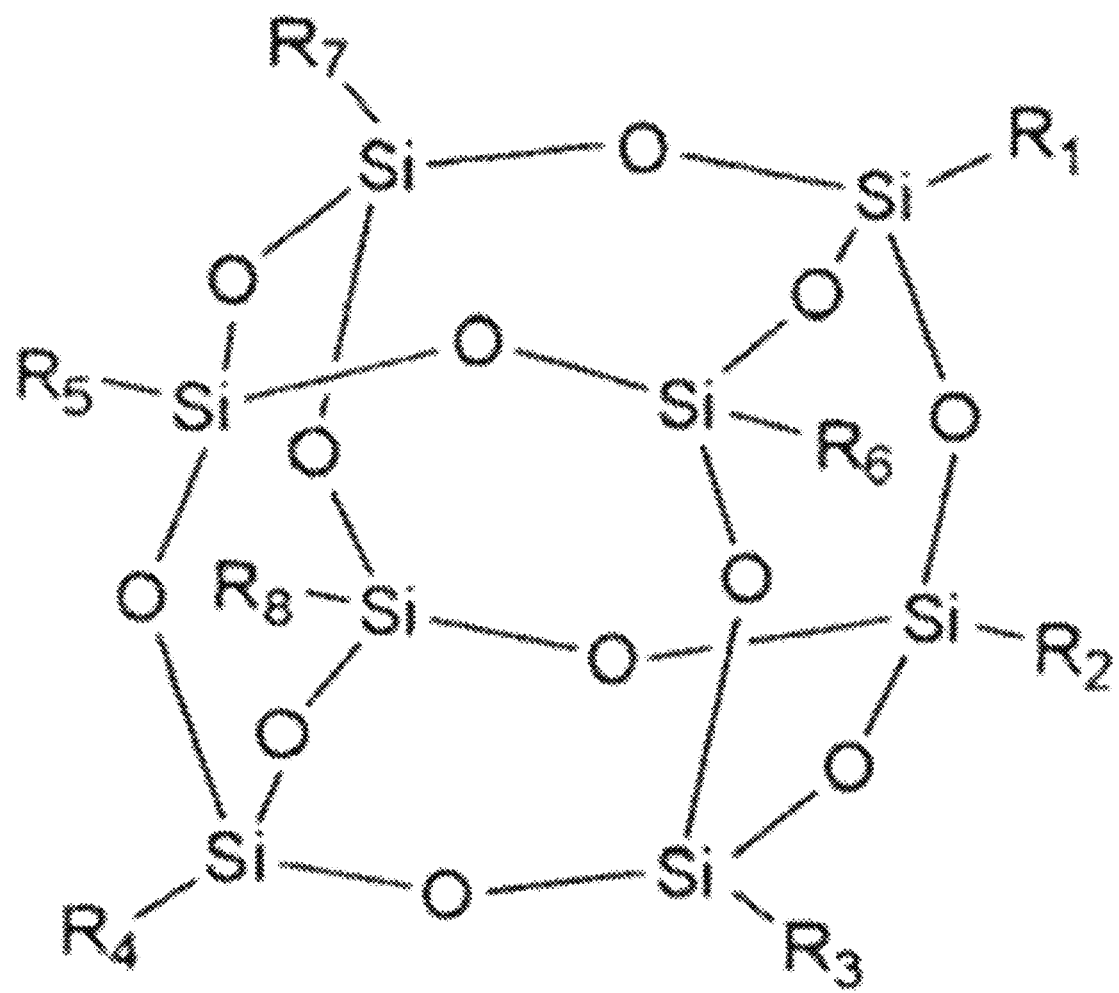
FIG. 1 schematically illustrates the core chemical structure of polyhedral oligomeric silsesquioxane (POSS).

The apparatus, systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of apparatus, arrangements, and methods for deagglomerating, debundling, dispersing, and functionalizing carbon nanotubes are hereinafter disclosed and described in detail with reference made to FIGS. 1-7.

There are two approaches in the industry to using carbon nanotubes to form a functional composite material: (1) add dry carbon nanotube powder to the composite resin mix under agitation; and (2) the other is to prepare a masterbatch or concentrate of 0.01%-15% (w/w) carbon nanotubes, which is then added to the composite resin mix under moderate or high shear agitation, where the effective dispersion and debundling of carbon nanotubes occurs during the preparation of the masterbatch or concentrate and the common loading for a masterbatch is on the order of about 10% (w/w). It is expected that by adding these materials under agitation, a stable, reliable mixture will be achieved that will provide favorable electrical properties in the final application. However, there are challenges posed by either above approach.

In the first case, carbon nanotube dry powder is very light, fluffy, and tends to go airborne in the presence of minimal air current or draft. Not only is this a loss of potentially valuable material affecting quality, but it is also an environmental, health, and safety concern. Too much combustible airborne powder can pose an explosion hazard, and air-borne carbon nanotube particles may pose a health risk to humans. Another issue is that adding CNT to a resin mix under moderate agitation does not provide sufficient shear to achieve uniform dispersion of carbon nanotubes. Still a third issue with adding CNT to a composite resin mixture is the question of processability: very often, viscosity will increase with time under agitation, leading to the composite resin matrix becoming too high in viscosity for processing. For these reasons, material compounders prefer to work with masterbatches or concentrates of carbon nanotubes. However, there are challenges posed by use of masterbatches as well. In the preparation of a masterbatch or concentrate, there are two issues that cause concern. The first is the difficult task of dispersing carbon nanotubes, which requires the breaking apart and dispersion of relatively large (micron-scale) agglomerates into much smaller particles and bundles in the range of hundreds of nanometers average particle size. The second issue is the question of exfoliation or debundling of small particles and agglomerates of strands that are tied together by a variety of forces, especially π-π and van der Waals interactions.

Carbon nanotubes form bundles held together by 7L-7L and van der Waals interactions are generally insoluble and not readily dispersed into monomers, polymers and solvents. This poses a fundamental processing challenge. In order to obtain optimum gain in electrical, mechanical, or other properties from the use of carbon nanotubes, it is necessary to achieve a stable, high level of dispersion, and debundling. For purposes of this disclosure, dispersion refers to the process of deagglomerating bundles of carbon nanotubes, and dispersing them uniformly into a medium. By contrast, debundling refers to the process of separating bundles of individual strands into smaller bundles and/or individualized strands. The end result must be a generally uniform distribution of strands throughout a monomer, solvent, and/or polymeric medium.

Typical physical and chemical dispersion techniques for the processing of carbon nanotube composites include ultrasonication, ball milling, etc., but these methods can cause irreversible damage to the carbon nanotubes. Other methods such as mechanical mixing, magnetic stirring, and shear intensive stirring impart less damage on the carbon nanotubes; however, such methods often leave the carbon nanotubes bundled. This is especially true of a specific class of carbon nanotubes referred to as single-wall carbon nanotubes (SWCNT).

Novel methods for dispersing or deagglomerating large (micron scale) bundles of carbon nanotubes, including SWCNT, include planar milling processes such as three-roll (or two-roll) milling. Use of a planar milling process reduces the damage to carbon nanotube particle, while allowing for efficient deagglomeration. However, a much more difficult task is to overcome π-π and van der Waals interactions by any form of milling or dispersion. A common problem for material compounders is that when carbon nanotubes (masterbatched or dry) are introduced into a coatings or composite formulation at sufficiently high loading as to achieve desired electrical conductivity, the viscosity of the compound becomes so high that it is difficult if not impossible to mix or process. Such conditions can cause mixers and other equipment to become unusable to mix the masterbatch. This is due to the surface area of carbon nanotubes compared to its overall weight or volume, which is very high and increases exponentially as small agglomerates begin to debundle.

An example of a typical masterbatch formulation used in this manner would be as follows: A low viscosity carrier resin or plasticizer: 90% w/w; and SWCNT: 10% w/w. In this example, the low viscosity carrier vehicle might be a plasticizer, such as dioctyl terephthalate, or a reactive resin, such as Aropol MR 17060, Polylite 32645-00, Multranol 3900, or a monofunctional epoxy diluent such as C12-14 aliphatic monoglycidyl ether (e.g. Heloxy 8, Chemmod8, Epodil 748, etc.), to list a few commercially available examples (out of many possibilities). Regarding the carbon nanotubes, an example of interest might include: Nano Carbon Matrix 2005-404 (MWCNT), from Interprome; and/or Tuball® (SWCNT), from OCSiAl, American Elements (SWCNT) to list a few out of many possible examples. An example of a mixture or compound that would exhibit the described difficulties is listed in the table below.

| | |
|---|---|
| Bis A epoxy resin (e.g YD 128, Epon 828) | 90.00 parts by weight (ppw) |
| C12-14 aliphatic monoglycidyl ether | 10.00 ppw |
| SWCNT | 00.10 ppw |
| Diethylene tetramine (e.g. D.E.H. 24) | 12.45 pw |

One issue with the described example, is the problem of incorporating SWCNT into the batch. SWCNT are very light and fluffy, and during the incorporation process, particles readily become airborne, causing loss of material and deficiencies to quality, in addition to environmental, health, and safety concerns. Another issue is the very low weight of material being added. In a production environment, it is difficult if not impossible to accurately weigh such a small quantity of material into a mixing or compounding process. Accordingly, as mentioned above, material compounders have made use of masterbatches of carbon nanotubes to help reduce or eliminate airborne particles and/or weighing issues into their process. An example of a mixture or compound incorporating the masterbatch is listed in the table below.

| | |
|---|---|
| Bis A epoxy resin (e.g YD 128, Epon 828) | 90.00 parts by weight (ppw) |
| C12-14 aliphatic monoglycidyl ether | 10.00 ppw |
| 10% SWCNT masterbatch | 1.00 ppw |
| D.E.H. 24 (epoxy curative) | 12.51 ppw |

In the above case, the 10% SWCNT masterbatch would likely be comprised of 90% C12-14 aliphatic monoglycidyl ether, and 10% Tuball (SWCNT). There are masterbatch formulations similar if not identical to this that are commercially available in the market (e.g. Matrix 203 from OCSiAl). By employing the commercially available masterbatch, the compounder is able to avoid the issues of airborne particles, and of weighing and controlling extremely small quantities of dry carbon nanotubes into their process. However, significant challenges remain, including issues of high viscosity.

As previously noted, carbon nanotubes, and especially SWCNTs, can be extremely high in surface area. In comparison, carbon black, a pigment commonly used in plastics and coatings, may have a typical particle size of 84 nanometers (nm) diameter and a surface area of roughly 60 square meters per gram ($m^2/g$). An extremely fine grade of carbon black, used in automotive exterior coatings, at the extreme end of carbon black, may have a mean particle of 9 nm and a surface of 550 $m^2/g$. Such carbon black pigments are typically considered to be extremely light, fluffy, and difficult to wet and disperse materials. By contrast, in dispersions using carbon nanotubes, surface area of the carbon nanotubes can excess of 7000 $m^2/g$ are common. So when a masterbatch dispersion of carbon nanotubes is added to a formulation in the manner described, one consequence that is nearly if not entirely unavoidable, is the issue of viscosity increase to the point of material will not flow and becomes unprocessable (this is similar to one of the problems of adding CNT dry). In some instances, viscosity can be so high as to damage and destroy mixing and other processing equipment. For processing methods where viscosity does not increase to the point that it is no longer processable, this typically means that the carbon nanotubes are not incorporated to the level that will allow for desired properties, especially static dissipative conductivity.

One way that material compounders have attempted to overcome this issue is by addition of dispersants or surfactants to their compound. To some degree, this process helps, by wetting out the carbon nanotubes, and thereby reducing the viscosity of the mixture. However, the drawback to wetting out carbon nanotubes is that point-to-point contact between debundled strands or particles can be sterically blocked. Consequently, the surfactant or dispersant chemistry used can be of critical importance to achieving electrical conductivity in the final application.

One class of molecule that is effective as a dispersant is polyhedral oligomeric silsesquioxane (POSS). The chemical structure of POSS is illustrated in FIG. 1. POSS, or, is a type of inorganic three-dimensional nanostructured Si—O cage (formula [RSiO1.5]n, where n=8, 10 and 12) surrounded by various organic groups with an overall diameter of 1-3 nm. Having eight organic groups surrounding a cage-like core connected by Si—O—Si bonds, POSS is highly soluble in many organic/inorganic solvents. POSS molecules exhibit compatibility with other organic and inorganic molecules depending on the specific structure and substituents of the POSS. However, achieving a carbon nanotube dispersion using POSS is not a straightforward process, and the process by which carbon nanotubes is introduced to POSS is very important. Control of chemical and physical interactions between the nanotubes and POSS molecules is crucial. An example of how POSS might be used by a material compounder is listed in the table below.

| | |
|---|---|
| Bis A epoxy resin (e.g YD 128, Epon 828) | 90.00 parts by weight (ppw) |
| C12-14 aliphatic monoglycidyl ether | 10.00 ppw |
| 10% SWCNT masterbatch | 1.00 ppw |
| POSS (epoxy functional) | 0.10 ppw |
| D.E.H. 24 (epoxy curative) | 12.51 ppw |

Adding POSS to an epoxy system to which a SWCNT masterbatch is added can help viscosity to a level that allows the material to remain processable. However, because the POSS is not incorporated into the dispersion of the masterbatch, optimal properties for viscosity and loading required for ESD are not achieved.

This disclosure describes efficient and scalable methods of dispersing carbon nanotubes with the use of a surfactant or "hyperdispersant. The carbon nanotubes loading in hyperdispersant range from 0.01% to 15% wt %. POSS chemistries are combined with carbon nanotubes and SWCNT using high shear mixing such as two roll or three roll mills. Examples of compositions tested are described below.

| Description | PPW | PPH |
|---|---|---|
| SWCNT | 40.000 | 6.897 |
| C12-14 aliphatic monoglycidyl ether | 480.000 | 82.759 |
| POSS (epoxy functional) | 60.000 | 10.345 |
| Paste Subtotal Prethickener | 580.000 | 100.00 |

| Description | PPW | PPH |
|---|---|---|
| SWCNT | 60.000 | 10.000 |
| C12-14 aliphatic monoglycidyl ether | 480.000 | 80.000 |
| POSS (epoxy functional) | 60.000 | 10.000 |
| Paste Subtotal Prethickener | 600.000 | 100.000 |

| Description | PPW | PPH |
|---|---|---|
| SWCNT | 60.000 | 10.000 |
| Plasticizer, Monomer, or Reactive Diluent | 520.000 | 90.000 |
| Paste Subtotal Prethickener | 600.000 | 100.000 |

In the above example, some possible plasticizers include dioctyl terephthalate, dioctyl sebacate, or dibutyl phthalate, while some possible monomers or diluents include trimethylolpropane diacrylate (for unsaturated cure) or C12-14 aliphatic monoglycidyl ether (for epoxide polymerizations).

Two factors to consider for debundling carbon nanotubes and dispersion are: applied shear stress and dispersion chemistry. Shear stress is required for debundling, whereas a good and effective additive environment stabilized carbon nanotubes and prevents reagglomerating due to high Van der Waals forces. With these considerations in mind, carbon nanotubes are mixed into a solution of additives and monomers, polymers, solvents using a flat blade. This suspension can be then processed with a two-roll mill or a three-roll mill. Following are some examples of making use of carbon nanotube dispersions to achieve electrical properties in composite formulations.

In general, the dry carbon nanotubes were incorporated into a resin matrix under high shear agitation, and subsequently dispersed via high shear mixing such as three-roll and two-roll mixing, in such a manner as to avoid introduction of undesired defects. Such a method can be achieved in stages:

The first stage is incorporation of carbon nanotubes into a liquid medium. Both carbon nanotube and SWCNT are extremely light and fluffy materials. Even as a container of carbon nanotubes is opened, very small air currents are likely to case small light agglomerates of carbon nanotubes to become airborne. Thus, introduction of carbon nanotubes to a liquid resin or solvent, prior to and during mixing, must be performed under carefully controlled conditions. One method for preparing a premixes of carbon nanotubes and liquids (resin, monomer, additives) suspension is to use a Cowles blade at minimal speed agitation (100-300 revolutions per minute, using mix blade ⅓ diameter of mix container. An exemplary process is as follows: (1) weigh 90 parts by weight of resin into a mix container; (2) attach the mix container to a mixer in a fume hood with carefully controlled air flow; (3) agitate at low speed; (4) pre-weighed carbon nanotubes for addition to the batch under conditions of minimal air flow; and (5) add carbon nanotubes to the batch under minimal agitation until incorporated.

Mixing in the early stages of processing is maintained at a very low shear, as this will expose higher surface area, and cause the viscosity and thixotropy of the mixture to increase significantly. Due to the high surface area of carbon nanotubes, excessive viscosity and thixotropy in the mix process will inhibit or prevent successful incorporation of dry carbon nanotubes into the liquid phase mixture. Flat bladeless disks can be use on the mixer or a paint shaker can be used in place of the mixer, which can reduce the quantity of shear to which a batch is exposed during the incorporation of carbon nanotubes into the liquid. Any mix technique may be utilized, including but not limited to planetary mixer, ribbon blender, etc., as long as the shear at this stage is kept minimal. The dispersant or POSS is typically present in the liquid mixture at the time that the carbon nanotubes are introduced. This occurs prior to deagglomeration, debundling, and dispersion, for effective results.

Figure 2:
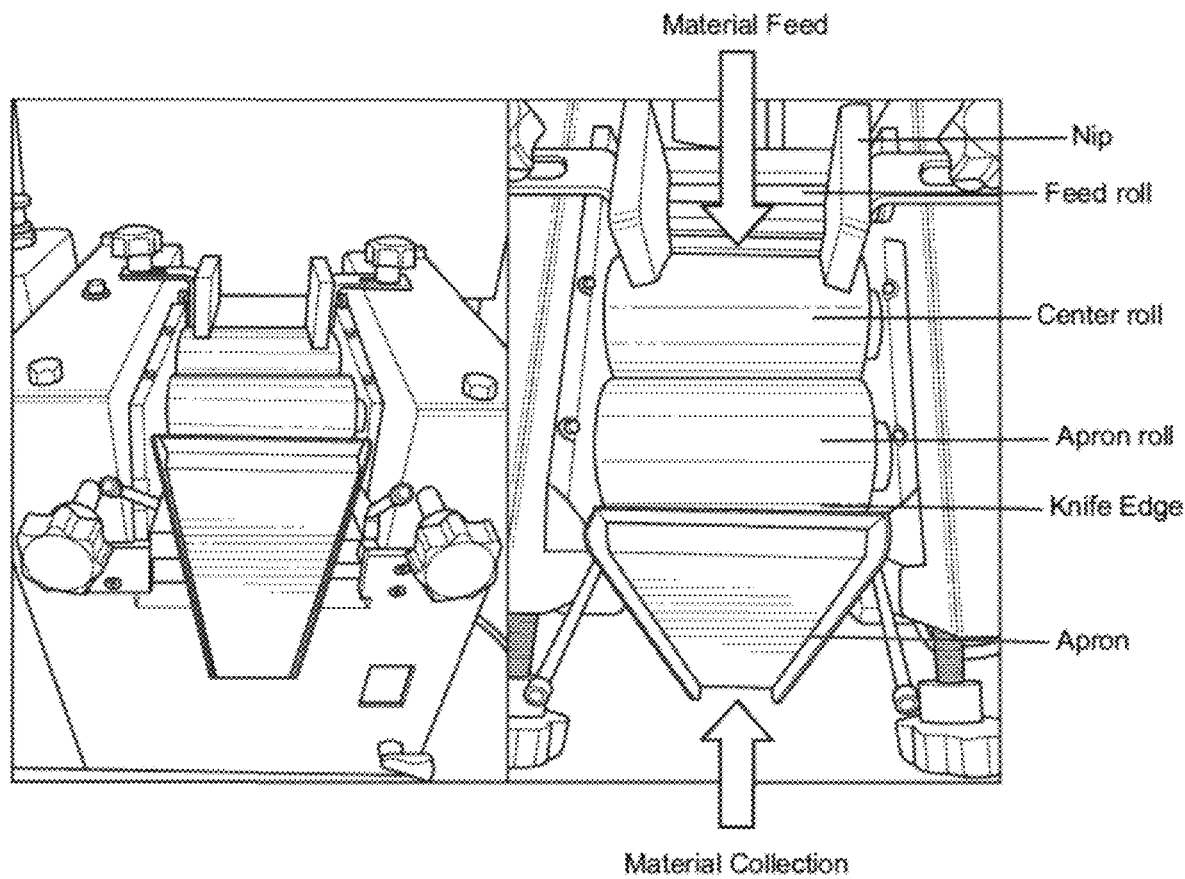
FIG. 2 is an image of a three-roll mill.
Figure 3:
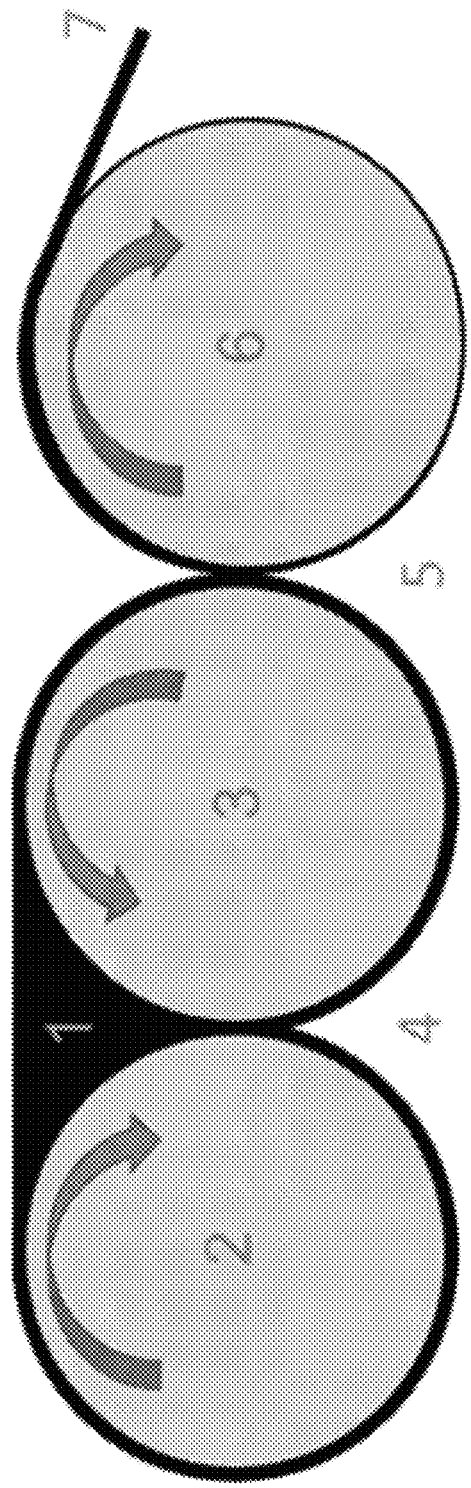
FIG. 3 is a schematic illustration of a three-roll mill.

The second stage is the deagglomeration, debundling, and dispersion of carbon nanotubes. This can be achieved through the use of a three-roll mill. FIG. 2 is an image of a three-roll mill. The material feed, or "nip" region is near the back of the mill; there are three rolls (a feed roll, center roll, and apron roll) located between the back of the mill and the front; and the apron is located at the very front of the mill where processed material is collected at the end of the process. FIG. 3 is a schematic illustration of a three-roll mill. The mixture is fed into the feed region (1) between the feed roll (2) and the center roll (3). This is the area that is sometimes referred to as the "nip" area due to its location between two nips on either side. Initially, the bulk of the material remains in the feed region while small amounts pass through the first high-shear nip (4) and remain adhered to the rollers as they are alternatively recirculated into the feed region by the feed roll or advanced to the second nip (5) by the center roll. After passing through the second nip, the material is again either recirculated into the feed region by the center roll or adheres to the apron roll (6) and is removed by the knife edge of the apron (7) for collection and quality control.

Following the mix stage, there are four parameters that influence the outcome of a planar milling process (e.g. processing through a three-roll mill) in which nanotubes are deagglomerated, debundled, and dispersed: (i) the rotating tip speed of the rolls; (ii), the gap between the rolls; (iii) the resultant shear rate arising as a combination of the tip speed and gap between the rolls; and (iv) the number of times that the material passes between each of the rolls and is deposited upon, the apron. For three-roll mill processing, the maximum shear is occurred in the regions between adjacent rollers, known as the nips. The nip width can be adjusted to balance the need for throughput of thick flakes and high applied shear stresses.

Liquid masterbatches as described above can be introduced to the feed area of the three-roll mill and processed for three passes using a three-roll mill as shown in FIG. 3. The tip speed, and therefore, the shear rates obtained are of importance, which, depending upon the roll and the gap distance, such shear rates can vary between 100 s$^{-1}$ and 600000 s$^{-1}$.

In one example, stable SWCNT dispersions can be blended with epoxy resin in varying proportion (90 to 5000 ppm w/w) and cured using triethylene tetramine at 1:1 equivalent stoichiometry. Sample can be prepared in a 2-inch diameter petri dishes, and twenty-mil (20-mil) drawdowns can be prepared on Leneta charts. Samples can be cured at 65° C.

Test methods for determining electrical resistivity of samples include: (1) cured samples are measured for thickness via digital calipers and sandwiched between two 75 mm square copper plates, where the plates were coated with an electrically conductive adhesive to assure uniform contact, electrodes were attached to the copper plates, and resistivity measurements are taken with a Ransburg resistivity meter; and (2) for cured drawdowns, electrodes were connected to the panels via electrical adhesive, approximately four cm apart, and resistivity measurements were taken. Two examples of instruments that can be used include the aforementioned Ransburg and a Sperry model DM-350A.

Figure 4:
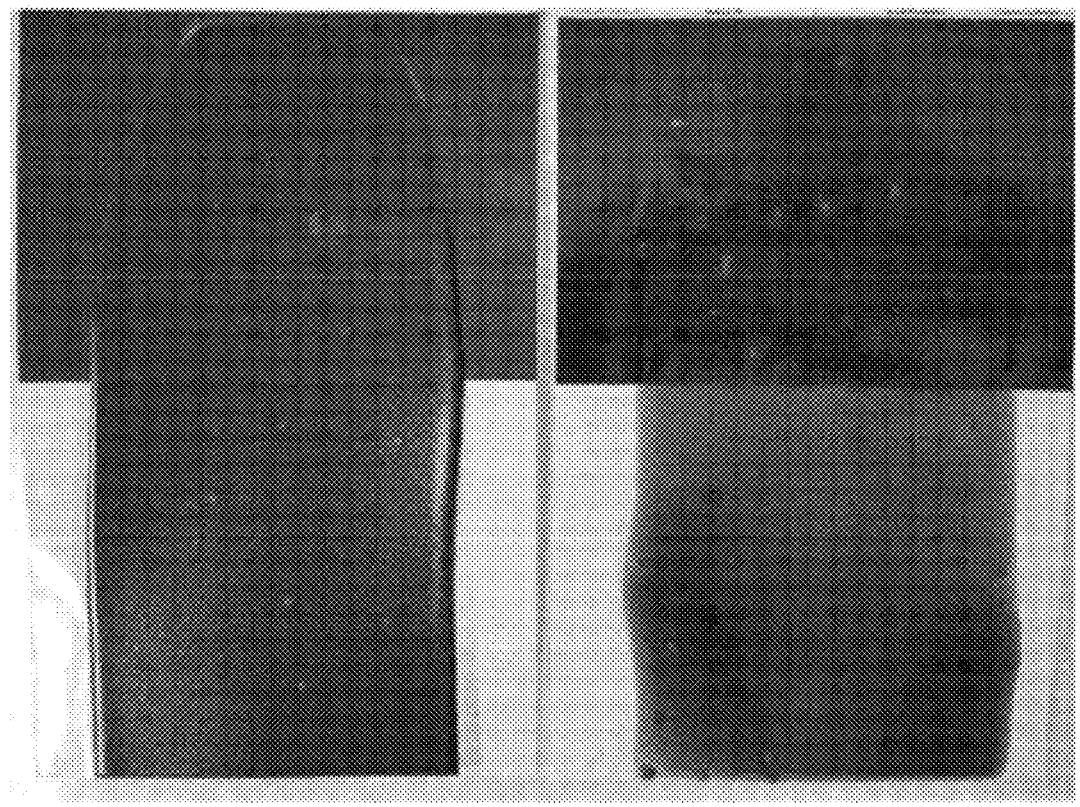
FIG. 4 depicts images of two drawdowns prepared used exemplary methods.

Two images of drawdowns of a SWCNT hyperdispersant in polymer composite prepared used exemplary methods are depicted in FIG. 4 (Sample 1 on the left and Sample 2 on the right). Results for certain characteristics are illustrated below for these samples.

The table below illustrate resistivity of several samples of SWCNT hyperdispersant in polymer composites prepared with varying percentages of carbon nanotubes.

| Sample 1 Summary | | |
|---|---|---|
| Sample Info | Resistivity | |
| % CNT | Ω/cm | Ω/cc |
| 0 | | |
| 0.100% | 2.18E+04 | 5.90E+02 |
| 0.150% | 1.62E+04 | 4.34E+02 |
| 0.200% | 1.67E+04 | 4.87E+02 |
| 0.250% | 8.20E+03 | 2.29E+02 |
| 0.300% | 7.65E+03 | 2.13E+02 |

| Sample 2 Summary | | |
|---|---|---|
| Sample Info | Resistivity | |
| % CNT | Ω/cm | Ω/cc |
| 0 | | |
| 0.100% | 2.93E+06 | 7.81E+04 |
| 0.150% | 3.75E+05 | 1.10E+04 |
| 0.200% | 2.49E+05 | 6.99E+03 |
| 0.250% | 9.65E+04 | 2.74E+03 |
| 0.300% | 1.64E+04 | 4.82E+02 |

Figure 5:
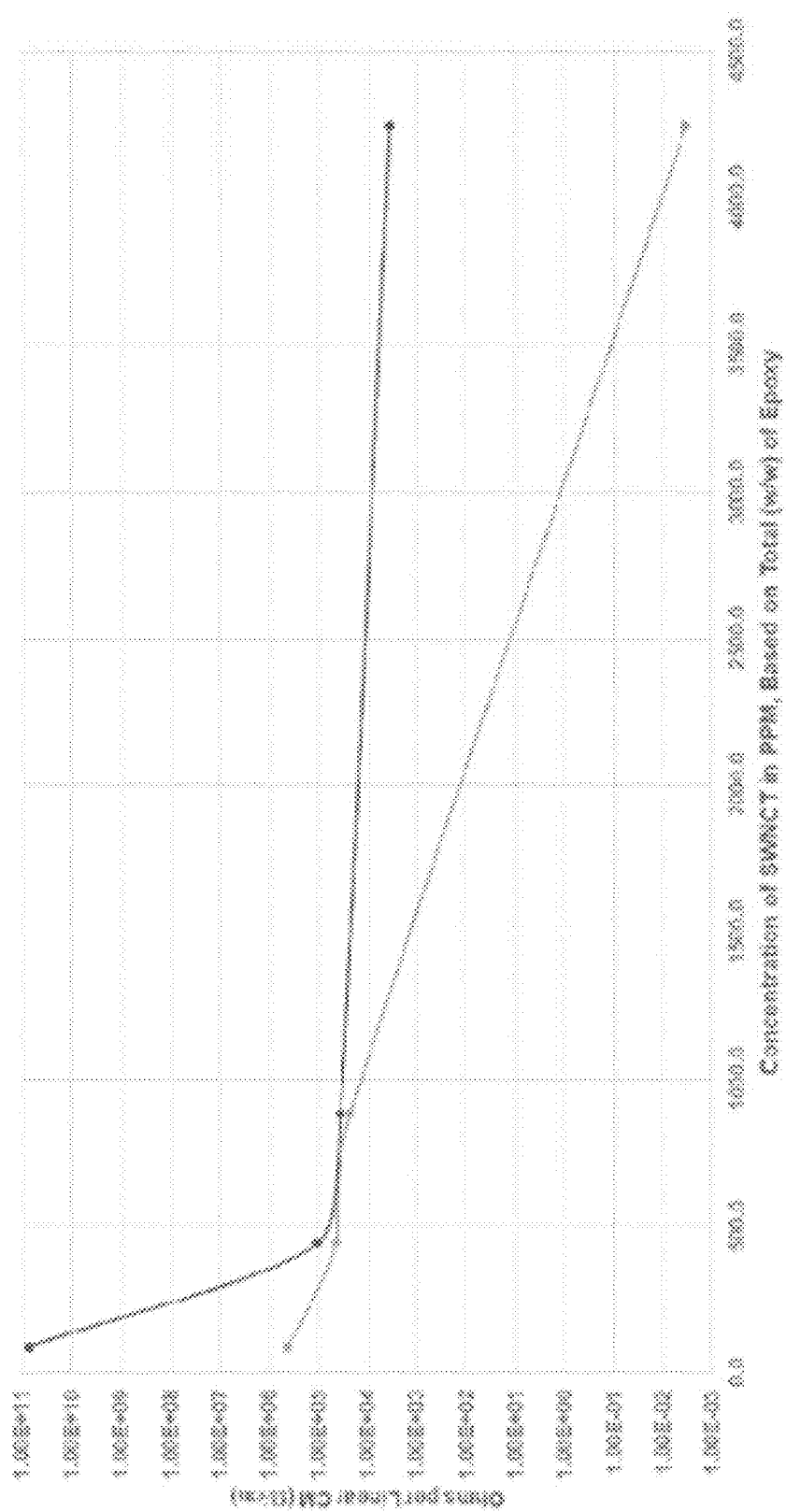
FIG. 5 is a graph illustrating the relationship between resistivity and concentration of SWCNT in epoxy composites.

FIG. 5 depicts a graph illustrating the relationship between resistivity and concentration of SWCNT in epoxy composites, with sample 2 shown in red (the top line) and sample 1 shown in green (the bottom line).

Figure 6:
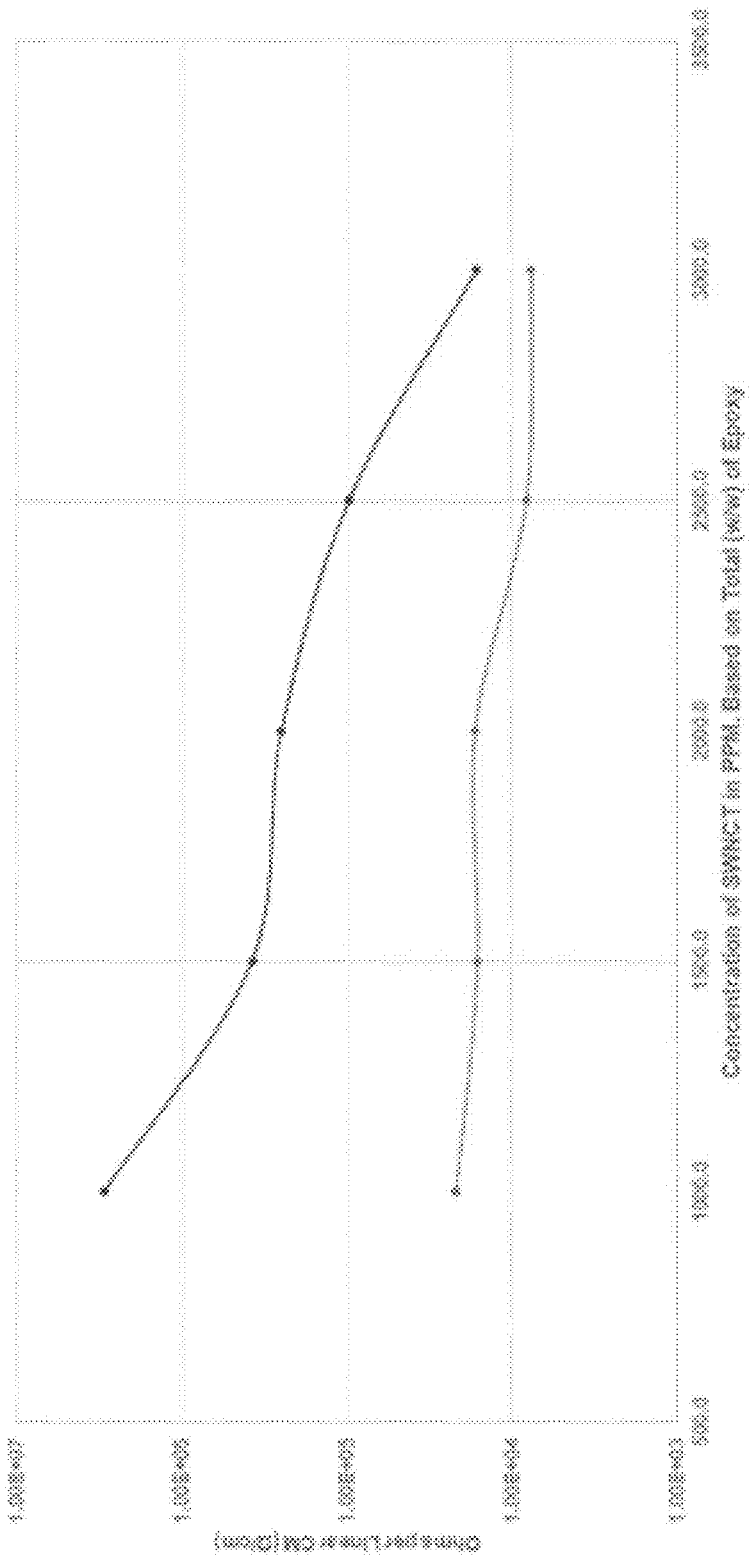
FIG. 6 is graph illustrating the relationship between resistivity and concentration of SWCNT in epoxy composites.

FIG. 6 depicts a graph further illustrating the relationship between resistivity and concentration of SWCNT in epoxy Composites, with sample 2 shown in red (the top line) and sample 1 shown in green (the bottom line).

Figure 7:
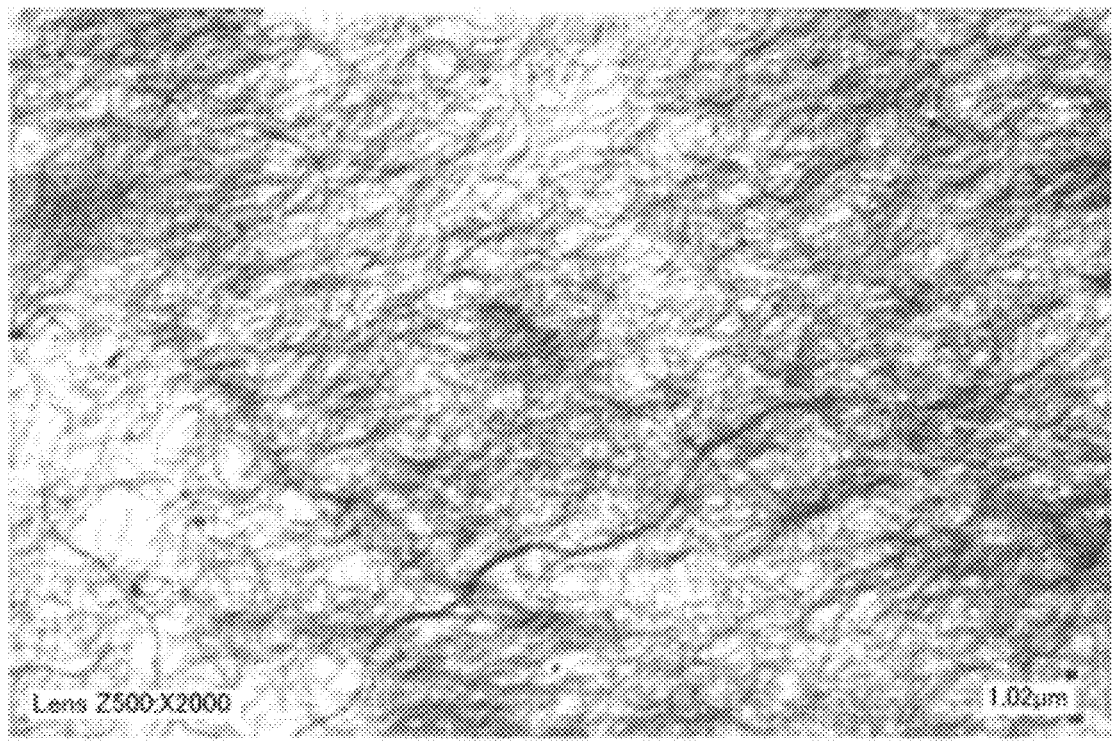
FIG. 7 is a microscopic image of SWCNT bundles

FIG. 7 is a microscopic image of SWCNT bundles. The image is a 2000 times microscopic image of SWCNT dispersion and is provided, via optical transmission of visible light. The scale is shown in the lower left. The SWCNT shown in this image is concentrated at 0.4% by weight in aqueous suspension.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

We claim:

1. A method of making a stable masterbatch dispersion including the steps of:
   providing a functionalized dispersant containing three-dimensional nanostructured amine, fluorine, or silsesquioxane cages in a liquid mixture
   adding carbon nanotubes to the liquid mixture in an amount from 0.01 wt % to 15 wt %; and
   deagglomerizing, debundling and dispersing the carbon nanotubes by subjecting the mixture to blending using a planar milling processes to form a masterbatch dispersion.

2. The method of claim 1 wherein the stable masterbatch dispersion comprises functionalized dispersants further comprising a low viscosity carrier resin or plasticizer in an amount of about 90% w/w; and single walled carbon nanotube (SWCNT) in an amount of about 10% w/w.

3. The method of making a stable masterbatch dispersion of claim 1, wherein the carbon nanotube liquid mixture further comprises plasticizers, diluents, monomers, polymers, or resins.

4. A method of making a stable masterbatch dispersion, including the steps of:
   providing a functionalized dispersant containing three-dimensional nanostructured amine, fluorine, or silsesquioxane cages in a liquid mixture
   adding carbon nanotubes to the liquid mixture in an amount from 0.01 wt % to 15 wt %; and
   deagglomerizing, debundling and dispersing the carbon nanotubes by subjecting the mixture to blending using a planar milling processes to form a masterbatch dispersion,
   wherein the functionalized dispersant further comprises epoxide, hydroxyl, or unsaturated functional groups.

5. A method of making a composite including the steps of:
   providing a functionalized dispersants containing amine, fluorine, or silsesquioxane cages in a liquid mixture;
   adding carbon nanotubes to the liquid mixture in an amount from 0.01 wt % to 15 wt %; and
   deagglomerizing, debundling and dispersing the carbon nanotubes by subjecting the mixture to blending using a planar milling processes to form a masterbatch dispersion,
   blending the masterbatch dispersion with a resin to form a composite.

6. The method of claim 5, wherein the carbon nanotubes present in a final composite concentration up to 5000 ppm w/w.

* * * * *